(12) United States Patent
Hirate et al.

(10) Patent No.: US 10,864,939 B2
(45) Date of Patent: Dec. 15, 2020

(54) STEERING ASSIST APPARATUS OF VEHICLE AND METHOD FOR STEERING ASSIST APPARATUS

(71) Applicant: DENSO CORPORATION, Kariya (JP)

(72) Inventors: Yosuke Hirate, Kariya (JP); Daiji Watanabe, Kariya (JP); Hisaya Akatsuka, Kariya (JP); Toshiya Kabayama, Kariya (JP)

(73) Assignee: DENSO CORPORATION, Kariya (JP)

( * ) Notice: Subject to any disclaimer, the term of this patent is extended or adjusted under 35 U.S.C. 154(b) by 289 days.

(21) Appl. No.: 15/958,825

(22) Filed: Apr. 20, 2018

(65) Prior Publication Data

US 2018/0304921 A1  Oct. 25, 2018

(30) Foreign Application Priority Data

Apr. 21, 2017 (JP) ................................ 2017-084079

(51) Int. Cl.
| | |
|---|---|
| *B62D 6/00* | (2006.01) |
| *B62D 15/02* | (2006.01) |
| *B62D 5/00* | (2006.01) |
| *G05D 1/02* | (2020.01) |
| *B62D 3/12* | (2006.01) |

(52) U.S. Cl.
CPC ............ *B62D 6/003* (2013.01); *B62D 5/008* (2013.01); *B62D 15/022* (2013.01); *B62D 15/025* (2013.01); *B62D 15/0285* (2013.01); *G05D 1/0212* (2013.01); *B62D 3/12* (2013.01)

(58) Field of Classification Search
CPC ............ B62D 6/00–10; B62D 15/0285; B62D 15/025; B62D 15/022; B62D 5/008; B62D 5/0457; B62D 5/046; B62D 5/0466
See application file for complete search history.

(56) References Cited

U.S. PATENT DOCUMENTS

| | | | |
|---|---|---|---|
| 2012/0123642 A1 | 5/2012 | Kojo | |
| 2012/0123643 A1 | 5/2012 | Limpibunterng et al. | |
| 2012/0197496 A1 | 8/2012 | Limpibunterng et al. | |
| 2015/0336607 A1* | 11/2015 | Inoue | B60W 30/045 |
| | | | 701/41 |

(Continued)

FOREIGN PATENT DOCUMENTS

| | | |
|---|---|---|
| JP | H05-170117 A | 7/1993 |
| JP | H10-226354 A | 8/1998 |

(Continued)

*Primary Examiner* — Spencer D Patton
(74) *Attorney, Agent, or Firm* — Maschoff Brennan (57) ABSTRACT

A steering assist apparatus on a vehicle is provided, including a steering drive unit that drives a steering apparatus; a steering control unit that executes an automatic steering mode in which the steering drive unit is controlled such that a turning angle is determined based on at least either a running state of the vehicle or road information to accomplish the determined turning angle; and a transmission ratio determining unit that determines, based on at least either a running state of the vehicle or the road information, a first transmission ratio in the automatic steering mode to be a value different from a second transmission ratio in a manual steering mode in which the steering apparatus operates in accordance with the steering angle inputted via a steering input apparatus.

13 Claims, 6 Drawing Sheets

(56) References Cited

U.S. PATENT DOCUMENTS

| | | | |
|---|---|---|---|
| 2017/0008557 A1* | 1/2017 | Mitsumoto | B62D 1/286 |
| 2018/0304920 A1 | 10/2018 | Hirate et al. | |
| 2018/0304922 A1 | 10/2018 | Hirate et al. | |

FOREIGN PATENT DOCUMENTS

| | | |
|---|---|---|
| JP | 2002-012159 A1 | 1/2002 |
| JP | 2010-137657 A1 | 6/2010 |
| JP | 2010-149612 A | 7/2010 |
| JP | 2011-031769 A | 2/2011 |
| JP | 2011-079410 A | 4/2011 |
| JP | 2012-166720 A | 9/2012 |
| JP | 2015-063244 A | 4/2015 |
| JP | 2015-137085 A | 7/2015 |
| JP | 2015-178332 A | 10/2015 |
| JP | 2015-182606 A | 10/2015 |
| WO | 2011/161779 A1 | 12/2011 |

\* cited by examiner

STEERING ASSIST APPARATUS OF VEHICLE AND METHOD FOR STEERING ASSIST APPARATUS

CROSS-REFERENCE TO RELATED APPLICATION

This application is based on and claims the benefit of priority from earlier Japanese Patent Application No. 2017-84079 filed Apr. 21, 2017, the description of which is incorporated herein by reference.

BACKGROUND

Technical Field

The present disclosure relates to a steering assist technique that controls the running locus of a vehicle.

Description of the Related Art

An automatic steering technique is known, in which a turning angle of a steering apparatus is controlled by using a running state of the own vehicle obtained by a detection apparatus such as radar apparatus and road information such as map information, without requiring an input from a steering as a steering input apparatus. For example, patent literature, JP-A-1993-170117 discloses the following technique. When the driver operates the steering during the automatic steering operation, manual steering is activated, which allows the steering to operate in response to a given steering angle using the steering. When performing the automatic steering operation, the steering operation of the steering apparatus is not transmitted to the steering so that the movement of the steering is fixed.

However, since the driver visually recognizes a state of the vehicle through the movement of the steering, when the behavior of the vehicle, that is, movement of the vehicle in the left-right direction significantly differs from the movement of the steering, the driver feels discomfort. On the other hand, when performing the automatic steering operation, a steering operation is not necessarily required for the driver. Hence, it is not necessary to operate the steering in a manner similar to the case of manual steering.

Therefore, the steering input apparatus is desired to operate not to cause the driver to feel discomfort.

SUMMARY

The present disclosure has been achieved in light of the above-described circumstances and provides embodiments in the following aspects.

According to a first aspect of the present disclosure, a steering assist apparatus of a vehicle is provided with a steering input apparatus and a steering apparatus, the steering input apparatus and the steering apparatus performing a differential operation with a transmission ratio which is a ratio of a change amount of a steering angle to a change amount of a turning angle.

The steering assist apparatus according to the first aspect includes a steering drive unit that drives the steering apparatus; a steering control unit that executes an automatic steering mode in which the steering drive unit is controlled such that a turning angle is determined based on at least either a running state of the vehicle or road information to accomplish the determined turning angle; and a transmission ratio determining unit that determines, based on at least either a running state of the vehicle or the road information, a first transmission ratio in the automatic steering mode to be a value different from a second transmission ratio in a manual steering mode in which the steering apparatus operates in accordance with the steering angle inputted via the steering input apparatus.

According to the steering assist apparatus of the vehicle in the above-describe first aspect, since the first transmission ratio during the automatic steering assist mode is determined, based on at least either a running state of the vehicle or road information, to be a value different from the second transmission ratio, the steering input apparatus can be operated not to cause the driver to feel discomfort.

The above-described second embodiment is a method for steering assist of a vehicle provided with a steering input apparatus and a steering apparatus, in which the steering input apparatus and the steering apparatus performs a differential operation with a transmission ratio which is a ratio of a change amount of a steering angle to a change amount of a turning angle. The method includes steps of: determining, based on at least either a running state of the vehicle or the road information, a first transmission ratio in an automatic steering mode to be a value different from a second transmission ratio in a manual steering mode in which the steering apparatus operates in accordance with the steering angle inputted via the steering input apparatus; and executing the automatic steering mode in which the steering drive unit is controlled such that a turning angle is determined based on at least either the running state of the vehicle or road information to produce the determined turning angle.

According to the method for steering assist of a vehicle in the above-described second aspect, since the first transmission ratio in an automatic steering mode is determined, based on at least either a running state of the vehicle or the road information, to be a value different from the second transmission ratio in a manual steering mode, the steering input apparatus can be operated in a manner not causing discomfort for the driver.

DETAILED DESCRIPTION OF PREFERRED EMBODIMENTS

Hereinafter, a steering assist apparatus and a steering assist control method in a vehicle according to the present disclosure will be described in accordance with embodiments.

First Embodiment

Figure 1:
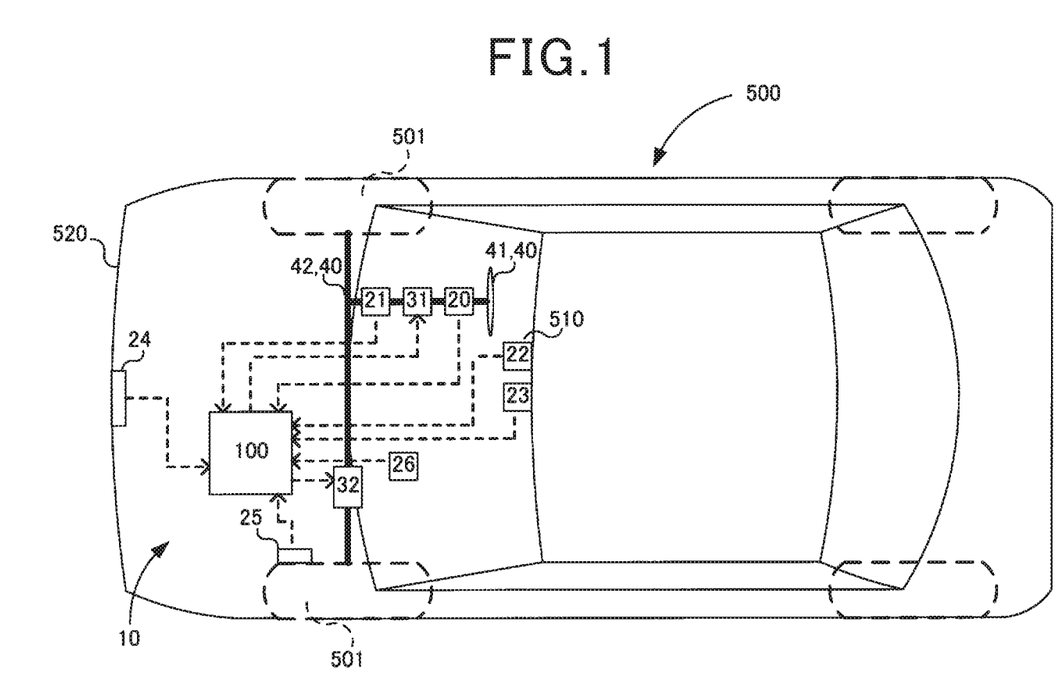
FIG. 1 is an explanatory diagram showing a vehicle in which a steering assist apparatus according to a first embodiment of the present disclosure is installed.

As shown in FIG. 1, a steering assist apparatus 10 according to the first embodiment is installed on a vehicle 500. The steering assist apparatus 10 is provided with a control unit 100, a rotational angle sensor 20 that detects a steering angle, a torque sensor 21, a front camera 22, a vehicle cabin camera 23, a millimeter wave radar device 24, a wheel speed sensor 25, a GPS 26, a variable steering angle apparatus 31 and a steering support apparatus 32. The vehicle 500 is provided with a front wheel 501, a steering wheel 41 as a steering input apparatus, a steering mechanism 40 including a steering apparatus 42, a windshield 510, and a front bumper 520. Note that the vehicle may include, as a detection part that detects objects, at least the millimeter wave radar device 24, and may also include any one of the front camera 22, and a LIDAR (laser radar). Alternatively, a stereo camera may be provided instead of the millimeter wave radar device 24 or the millimeter wave radar device 24 together with a stereo camera may also be provided. According to the present embodiment, the front camera 22 and the millimeter wave radar device 24 are provided as the detection part.

Figure 2:
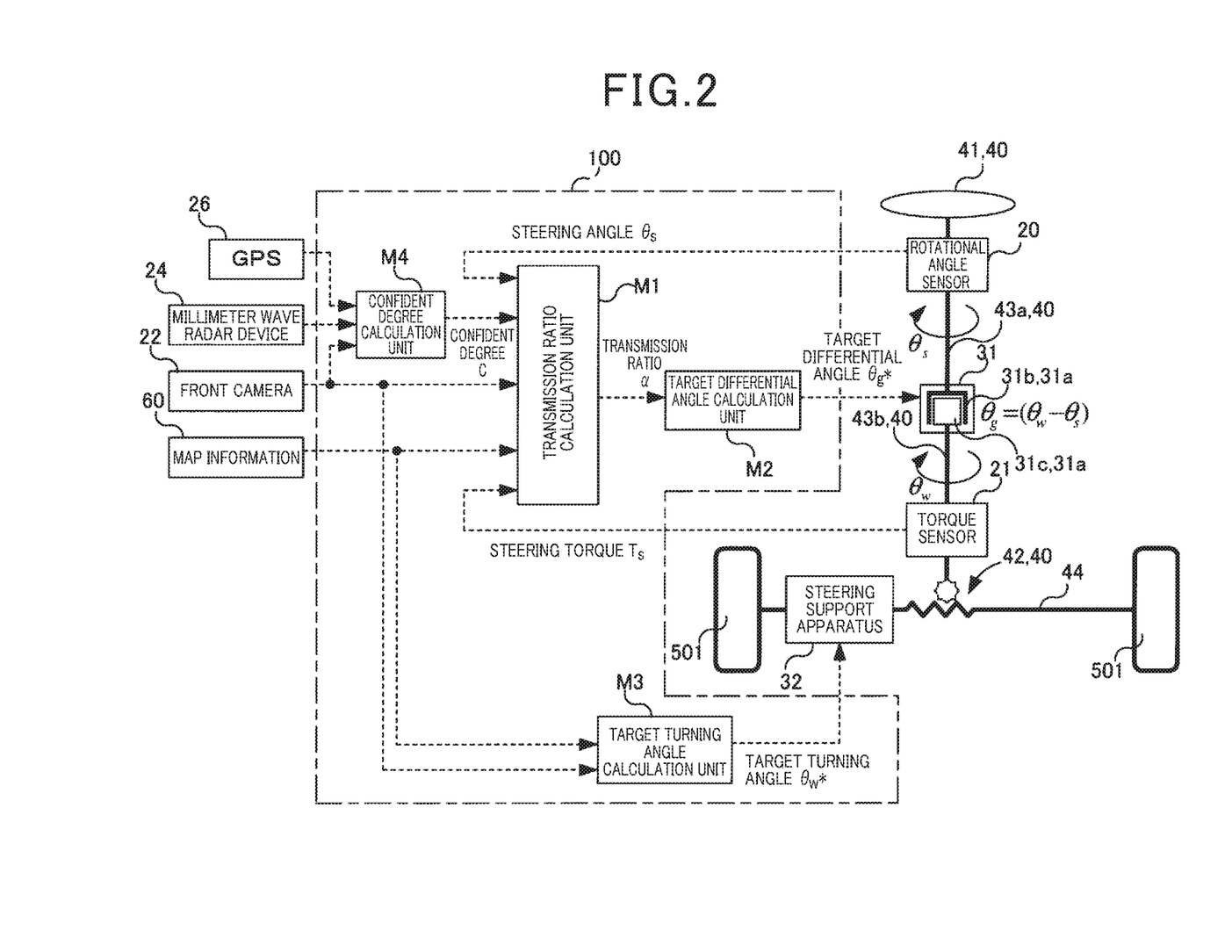
FIG. 2 is a functional block diagram showing an overall concept of a process executed by a control unit included in the steering assist apparatus according to the first embodiment.

As shown in FIG. 2, in the vehicle 500, the steering mechanism 40 is provided with the steering wheel 41 as a steering input apparatus to which the driver inputs a steering operation, the steering apparatus 42 that changes the turning angle of the front wheel 501, a steering shaft 43a and 43b that couples the steering wheel 41 and the steering apparatus 42, and a turning shaft 44 that couples the steering apparatus 42 and the front wheel 501. The wheel to be steered may be the rear wheel. According to the present embodiment, the vehicle includes the variable steering angle apparatus 31, and the steering shaft is configured of an upper steering shaft 43a that couples the steering wheel 41 and the variable steering angle apparatus 31, and a lower steering shaft 43b that couples the variable steering angle apparatus 31 and the steering apparatus 42. The rotational angle sensor 20 is provided to the upper steering shaft 43a, to detect a steering angle of the steering wheel 41, that is, the steering position of the steering wheel 41 as a rotational angle of the upper steering shaft 43a. The torque sensor 21 is provided to the lower steering shaft 43b, which detects the rotational torque of the lower steering shaft 43b as the steering force.

The steering apparatus 42 is a rack-and-pinion type apparatus, including a pinion gear disposed at a tip end of the lower steering shaft 43b, that is, an end portion opposite to an end portion connected to the variable steering angle apparatus 31, and a rack gear provided to the tuning shaft 44. The rack and pinion gear mechanism converts the rotary motion of the lower steering shaft 43b to motion in the axis direction of the turning shaft 44 (i.e., linear motion) to drive the turning shaft 44 in the axial direction, whereby the front wheel 501 is steered with a desired turning angle.

The variable steering angle apparatus 31 continuously and variably generates a differential angle between the rotation angle of the input shaft and the rotation angle of the output shaft. The variable steering angle apparatus 31 incudes a motor 31a and a motor control unit which is not shown. The motor 31a is, for example, a brushless DC motor, in which a housing having a stator 31b fixed thereto is connected to the upper steering shaft 43a, and the output shaft having the same axis as the rotor 31c of the motor 31a is coupled to the lower steering shaft 43b via a reduction speed mechanism which is not shown. Hence, a differential angle $\theta g=(\theta w-\theta s)$ is present between the steering angle $\theta s$ and the turning angle $\theta w$, which is uniquely determined by a reduction ratio of the reduction speed mechanism. Since the variable steering angle apparatus 31 is provided with the motor 31a, a relative angle between the housing and the output shaft is variable so that the differential angle $\theta g$ between the steering angle of the steering wheel 41 and the turning angle of the steering apparatus 42 is also continuous variable. As the reduction speed mechanism, a planetary gear mechanism or a wave motion gear mechanism are used. In the case where the torque of the motor 31a is sufficiently high, the reduction speed mechanism is not necessarily provided. Further, when a steer-by-wire mechanism is used, which requires no physical connection between the upper steering shaft 43a and the lower steering shaft 43b, the reduction speed mechanism is unnecessary.

The steering support apparatus 32 is provided with a motor which is not shown and a motor control unit. The output shaft of the motor has a pinion gear at a tip end of the output shaft of the motor, and a reduction speed mechanism at the tip end of the motor if necessary. The pinion gear of the steering support apparatus 32 meshes with a rack gear provided to the turning shaft 44, whereby the turning shaft 44 is driven by the motor torque. Therefore, the steering support apparatus 32 corresponds to a steering drive unit that drives the steering apparatus 42. The steering drive unit drives the steering apparatus 42 via the steering shaft 44 without the steering force of the driver which is transmitted from the steering wheel 41, thereby achieving desired turning of the front wheel 501. Note that the steering support apparatus 32 can be also used as a steering force support apparatus that supports the steering force transmitted from the steering wheel 41. Further, the steering support apparatus 32 may include a configuration in which a motor is disposed on the same axis as the steering shaft 44, or the steering support apparatus 32 may be integrated to the steering apparatus 42.

Figure 3:
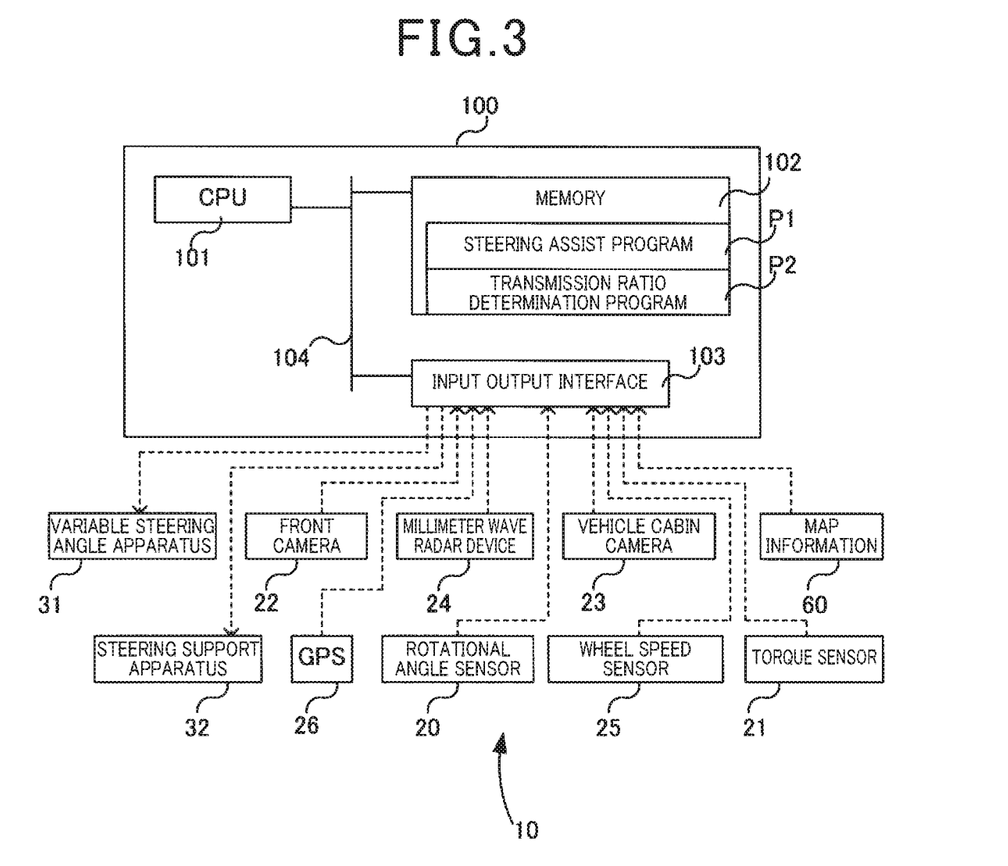
FIG. 3 is a block diagram showing functional elements of the control unit included in the steering assist apparatus according to the first embodiment.

As shown in FIG. 3, the control unit 100 includes a central processing unit (CPU) 101, a memory 102, an input/output interface 103 and a bus 104. The CPU 101, the memory 102 and the input/output interface 103 are electrically connected via a bus to be capable of performing a bi-directional communication therebetween. The memory 102 includes a memory region as a read-only non-volatile memory such as ROM, storing a steering assist program P1 and a transmission ratio determination program P2, and a memory region as a volatile memory such as RAM, where the CPU 101 can read or write. The memory 102 also includes a memory region that stores a map data used for a navigation system. The steering assist program P1 determines the turning angle $\theta w$, i.e., target turning angle $\theta w*$ which is set by the steering apparatus 42 in accordance with at least either a running state of the vehicle or the road information, and executes an automatic steering mode that controls the steering support apparatus 32. The transmission ratio determination program P2 determines a transmission ratio α in the automatic steering mode based on the running state of the vehicle or the road information. The CPU 101 serves as a steering control unit that executes the automatic steering mode, when executing the steering assist program P1 and serves as a transmission ratio determining unit that determines a transmission ratio $\alpha_{auto}$ in the automatic steering mode to be a value different from that of a transmission ratio $\alpha_{men}$, when executing the transmission ratio determination program P2. The control unit that executes the automatic steering mode may include, in addition to the CPU 101, the steering support apparatus 32 that controls the turning angle of the steering apparatus 42 in response to the control signal of the CPU 101. According to the present embodiment, the steering support apparatus 32 is a steering apparatus driving unit in the automatic steering mode, serving as an actuator that drives the steering apparatus 42, thereby achieving the target turning angle θw*. The CPU 101 may be configured of a single CPU or a plurality of CPUs that execute various programs, or a multi-threaded CPU capable of simultaneously executing a plurality of programs.

Each of the rotational angle sensor 20, the torque sensor 21, the front camera 22, the vehicle cabin camera 23, the millimeter wave radar device 24, the wheel speed sensor 25, the GPS 26, a variable steering angle apparatus 31 and a steering support apparatus 32 is connected to the input/output interface 103 via a control signal line. The detection information is transmitted from the rotational angle sensor 20, the torque sensor 21, the front camera 22, the vehicle cabin camera 23, the millimeter wave radar device 24, the wheel speed sensor 25 and the GPS 26 via the input/output interface 103. The control signals that command a target differential angle and a target turning angle are transmitted to the variable steering angle apparatus 31 and the steering support apparatus 32 via the input/output interface 103.

The rotational angle sensor 20 detects a steering position of the steering wheel 41, that is, a rotation angle of the upper steering shaft 43a. For example, the rotational angle sensor 20 may output a positive value for right rotation and a negative value for left rotation with respect to an angle 0° of the steering wheel 41 when the vehicle runs straight. Alternatively, the rotational angle sensor may output the steering angle as a positive value using 360° absolute angle and the rotation speed. As the rotational angle sensor 20, a magnetic type rotational angle sensor can be used.

The torque sensor 21 detects a rotational torque of the lower steering shaft 43b caused by the steering input from the steering wheel 41. The torque sensor 21 converts a phase difference caused by torsion produced on the torsion bar that couples divided two portions (not shown) of the lower steering shaft 43b, thereby detecting a steering torque as a steering power. For the steering torque to be detected, right turn shows positive value and left turn shows negative value with respect to the steering angle of the steering wheel 41 when the vehicle runs straight. The torque sensor 21 may include an integrated rotational angle sensor that detects the turning angle. Also, the torque sensor 21 may be provided to the upper steering shaft 43a.

The front camera 22 is configured of an imaging apparatus provided with an imaging device such as CCD, serving as a sensor that outputs image data as a detection result of contour information of the object by receiving visible light. The image data outputted from the front camera 22 is configured of a plurality of frame images successive with time. Each frame image is expressed by pixel data. According to the present embodiment, the front camera is disposed in the center of upper part of the windshield 510. The pixel data outputted by the front camera 22 is monochrome pixel data or color pixel data. The front camera 22 is configured of a monocular camera or a compound-eye stereo camera.

The vehicle cabin camera 23 has the same configuration as the front camera 22. The vehicle cabin camera 23 is used for detecting a state of the driver in the vehicle cabin such as an angle of head, a state of eyelids, and visual-line movement.

The millimeter wave radar device 24 is a sensor that emits millimeter waves, and receives reflected waves reflected at an object, thereby detecting position of the object and the distance to the object. According to the present embodiment, the millimeter wave radar device 24 is disposed in the center of the front bumper 520, but, a plurality of millimeter wave radar devices 24 may be disposed through the entire surfaces of the front bumper 520, or on both side surfaces of the front bumper 520. The detection signal outputted from the millimeter wave radar device 24 may be a signal consisting of sequence of points that shows a representative position of the object recognized with processed received waves in a processing circuit included in the millimeter wave radar device 24, or the detection signal may be a signal representing unprocessed received waves. In the case where the unprocessed received signal is used as the detection signal, signal processing is performed in the control unit 100 so as to detect the position of the object and distance to the object. Note that instead of using a millimeter radar device, LIDAR may be used.

The wheel speed sensor 25 is mounted to each of the front wheels 501 and serves as a sensor detecting a rotation speed of the front wheel 501. The detection signal outputted from the wheel speed sensor 25 is pulse waves in which the voltage thereof is proportional to the wheel speed or an interval thereof is determined in response to the wheel speed. By using the detection signal from the wheel speed sensor 25, information such as the vehicle speed and travel distance of the vehicle.

The GPS (global positioning system) 26 is a system including a receiver that receives signals from the GPS satellites and a control unit that determines a position of the receiver using the received signal, which identifies the vehicle position (latitude, altitude). The control unit 100 can determine road information by using the vehicle position obtained by the GPS 26, and map information 60 in which the vehicle position obtained by the GPS 26 is mapped on the map data. Note that the road information also includes, for example, information obtained through communication with other vehicles, that is, traffic information obtained from infrastructure related to traffic information.

As shown in FIG. 2, the control unit 100 composes, by executing various programs with the CPU 101, a transmission ratio calculation unit M1, a target differential angle calculation unit M2, a target turning angle calculation unit M3, and a confidence degree calculation unit M4. The transmission ratio calculation unit M1 is accomplished by executing the transmission ratio determination program P2 with the CPU 101, to calculate the transmission ratio α which is a ratio of a change amount of the turning angle (Δθw) to a change amount of the steering angle (Δθs). That is, the transmission ratio α is determined as the transmission ratio α=Δθw/Δθs. The transmission ratio calculation unit M1 determines the transmission ratio α depending on the steering mode of the vehicle, such that the transmission ratio α is set to be a second transmission ratio $\alpha_{man}$ in the manual steering mode, and the transmission ratio α is set in the automatic steering mode, to be a first transmission ratio $\alpha_{auto}$ which is different from the second transmission ratio $\alpha_{man}$ of the manual steering mode, by using at least a running state of the vehicle or the road information. The first transmission ratio $\alpha_{auto}$ in the automatic steering mode is set to be a value larger than the second transmission ratio $\alpha_{man}$ in order to suppress a movement of the steering wheel 41 during the automatic steering mode.

The target differential angle calculation unit M2 calculates, by using the transmission ratio $\alpha$, a target turning angle $\theta g^*$ which is a differentia angle to be produced by the variable steering angle apparatus 31. The target differential angle calculation unit M2 is accomplished by the CPU 101 executing the transmission ratio determination program P2, in which the target differential angle $\theta g^*$ is calculated by using the transmission ratio $\alpha$ obtained by the transmission ratio calculation unit M1, in accordance with the following equation (1).

$$\theta g^* = (\alpha - 1)\theta s \qquad (1)$$

The target differential angle calculation unit M2 transmits the calculated target differential angle $\theta g^*$ to the variable steering angle apparatus 31. In the variable steering angle apparatus 31, the motor control unit converts the received target differential angle $\theta g^*$ to the motor torque command, thereby controlling the motor to achieve the target differential angle $\theta g^*$. Note that a change amount of the target differential angle $\Delta \theta g^*$ may be obtained instead of the target differential angle $\theta g^*$ to transmit the target differential angle $\Delta \theta g^*$ to the motor control unit. In this case, a command value to be transmitted to the motor can be calculated by adding the angle $\Delta g$ as an origin to the change amount of the target differential angle $\Delta \theta g^*$. The driver visually recognizes a movement of the steering wheel 41 as a change amount of the movement. However, the motor torque command for the motor is defined as a command to achieve the target differential angle $\theta g^*$.

The target turning angle calculation unit M3 calculates the target turning angle $\theta w^*$ which is controlled by the steering support apparatus 32, by using an image signal from the front camera 22, a running state including a detection signal from the millimeter wave radar 24, and road information including a map information 60. The target turning angle $\theta w^*$ does not depend on the steering angle inputted by the driver via the steering wheel 41, but is determined as the turning angle $\theta w$ of the steering apparatus 42, based on the running speed of the own vehicle, running state affected by front/side vehicles and obstacles on the running route, road information including shape of the road such as straight, curve, increasing/decreasing the number of traffic lanes and sloping road. The target turning angle $\theta w^*$ is transmitted to the motor control unit of the steering support apparatus 32 from the target turning angle calculation unit M3. The steering support apparatus 32 converts the target turning angle $\theta w^*$ received by the motor control unit to be the motor torque command, thereby controlling the motor to achieve the target turning angle $\theta w^*$.

The confidence degree calculation unit M4 determines a confidence degree C. as an index of whether the automatic steering mode is continued or not, or whether the level of the automatic steering mode is changed or not. The confidence degree calculation unit M4 is connected to various sensors which acquires environmental information of outside the vehicle such as the front camera 22, the millimeter wave radar 24 and the GPS 26. These sensors transmit operational levels of respective sensors to the confidence degree calculation unit M4. The operational level refers to an index of how accurately the environmental information is acquired by various sensors, which is determined based on, in addition to faults of sensors themselves, a recognition level influenced by a weather condition such as haze and rain, or blurring of road indication such as white lines, when using the front camera, or a recognition level for recognizing whether successive point groups showing objects are acquired when using the millimeter wave radar 24, and an accuracy level depending on the number of available GPS signals when using the GPS 26. The confidence degree calculation unit M4 determines the confidence degree C. by using logical AND or logical OR of these operational levels.

The automatic steering mode is accomplished by executing the steering assist program P1 with the CPU 101. The CPU 101 determines a running locus along which the own vehicle runs, based on the state of the own vehicle and running state including other vehicles, and the road information including the map information 60. Also, the CPU 101 successively determines the target turning angle $\theta w^*$ which is the turning angle with which the front wheel 501 is required to turn based on the running speed of the own vehicle obtained by the wheel speed sensor 25 and the map information 60 in which the own vehicle position is mapped by using the GPS 26. The running locus determined by the CPU 101 and the target turning angle $\theta w^*$ successively determined by the CPU 101 are transmitted to the steering support apparatus 32. The motor control unit of the steering support apparatus 32 applies a torque command depending on the received target turning angle $\theta w^*$, for example, voltage to the motor, thereby accomplishing the target turning angle $\theta w^*$ of the steering support apparatus 32. Note that the automatic steering mode may use, other than the running state and the road information, a route information which is programmed in advance, guidance information installed along the road, for example, information from a guidance information facility that provides beacon or the like.

When the automatic steering mode is operating, the steering angle of the steering wheel 41 changes in response to the operation of the steering apparatus 42. Specifically, the steering wheel 41 operates in response to the differential angle $\theta g$ determined by the transmission ratio $\alpha_{auto}$ and the target turning angle $\theta w^*$. In other words, the steering wheel 41 operates based on the steering angle $\theta s$ which is determined in accordance with the turning angle $\theta w$ in the automatic steering operation. The steering angle $\theta s$=turning angle $\theta w$−differential angle $\theta g$. Since the actual movement of the steering wheel 41 recognized by the driver is defined as a change amount of the steering angle $\Delta \theta s$, the following equations are provided.

change amount of the steering angle $\Delta \theta s$=turning angle $\theta w$−differential angle $\theta g$ change amount of the differential angle $\Delta \theta g = (1 - 1/\alpha_{auto})\Delta \theta w$ The automatic steering mode may be executed, for example, under a driving support mode performing only steering support in accordance with at least either the running state or the road information, or an automatic driving support mode including a driving support that accelerates the own vehicle and a braking support in addition to the steering support. The automatic steering mode may be performed not only for a case where the vehicle runs on an ordinary road and an expressway, but also for a case where the vehicle is parking in a parking lot or starting from the parking lot. The automatic steering mode continues to execute until an operation switch that turns the automatic steering mode ON or OFF is turned OFF, or an operation switch that turns the automatic driving mode ON or OFF is turned OFF. Hence, after the driver intervenes in the steering operation, and when the predetermined period subsequently elapses without intervention by the driver, the prioritized process of the manual steering mode is terminated, and the steering mode using the automatic steering mode is executed again or, an automatic steering mode which has been suspended is resumed.

Figure 4:
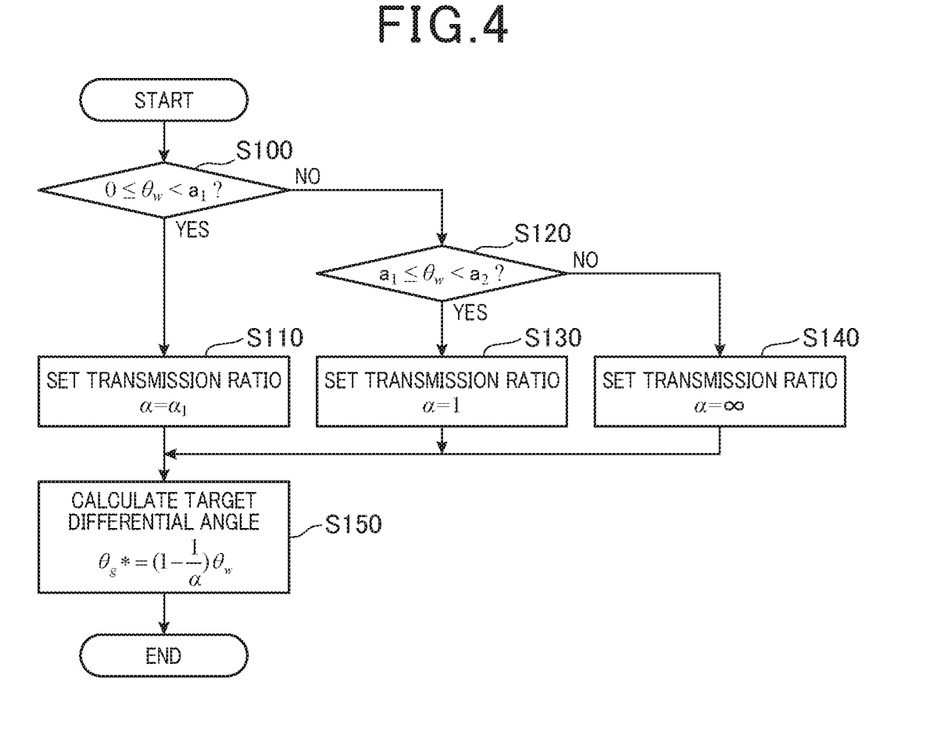
FIG. 4 is a flowchart showing a process flow of a determining process of a transmission ratio executed by the steering assist apparatus according to the first embodiment.
Figure 5:
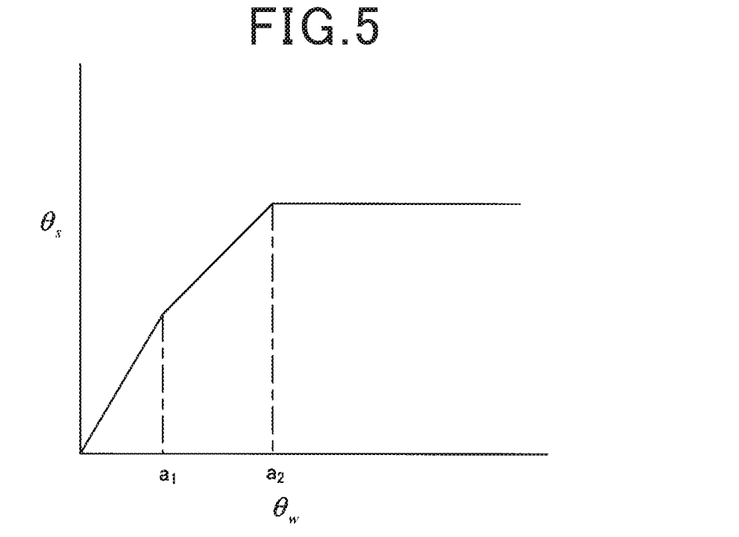
FIG. 5 is an explanatory diagram showing a correspondence between a turning angle and a steering angle in the steering assist apparatus according to the first embodiment.

With reference to FIGS. 4 and 5, a transmission determination process executed by a steering assist apparatus 10 according to the first embodiment will be described. The CPU 101 executes the steering assist program P1, and the transmission ratio determination program P2 after the automatic steering mode is turned ON, thereby executing a process routine shown in FIG. 4. The process routine shown in FIG. 4 is repeatedly executed at predetermined periods until the automatic steering mode switch is turned OFF.

The CPU 101 acquires the current turning angle θw and determines whether the current turning angle θw satisfies a relationship 0≤θw<$a_1$ at step S100. Note that the turning angle θw may be the target turning angle θw* which is accepted by the steering support apparatus 32, or may be actual turning angle θw obtained by a rotational angle sensor (not shown) mounted to the lower steering shaft 43b. In the case where the transmission ratio α is determined considering the steering angle θs of the steering wheel 41, the current transmission ratio α and the current turning angle θw may be used to obtain the steering angle θs=θw/α and may determine a first transmission ratio $α_{auto}$ depending on which range in a plurality of determination ranges set in advance the obtained steering angle θs belongs to. In this case, the current transmission ratio α may be a transmission ratio α immediately before the automatic steering mode is enabled, that is a second transmission ratio $α_{man}$ in the manual steering mode, or may be a transmission ratio $α_{auto}$ as an initial value when operating the automatic steering operation.

When the CPU 101 determines that the relationship 0≤θw<$a_1$ is satisfied (step S100: YES), the CPU 101 sets the transmission ratio α, that is, the first transmission ratio $α_{auto}$ to be the transmission ratio $α_1$ (step S110). The transmission ratio $α_1$ is a value less than 1. Hence, as shown in FIG. 5, the steering angle θs and the change amount of steering angle Δθs are larger than the turning angle θw and the change amount of the turning angle Δθw so that the change amount of steering angle Δθs can be sufficiently large in a region where the turning angle θw is very small and the driver is likely to sense the difference between the turning angle θw and steering angle θs. As a result, discomfort of the driver can be reduced or eliminated. Note that the horizontal axis of FIG. 5 shows the turning angle θw and the vertical axis shows a steering angle θs.

When the CPU 101 determines that the relationship 0≤θw<$a_1$ is not satisfied (step S100: No), the CPU 101 determines whether a relationship a1≤θw<$a_2$ is satisfied or not (step S120). When the CPU 101 determines that a relationship $a_1$≤θw<$a_2$ is satisfied (step S120: Yes), the CPU 101 sets the transmission ratio α, that is, first transmission ratio $α_{auto}$ to be 1 (step S130). Therefore, as shown in FIG. 5, the steering angle θs and the change amount of the steering angle Δθs are the same as the turning angle θw and the change amount of the turning angle Δθw so that the driver does not feel discomfort in a region of the tuning angle θw where the driver is unlikely to sense the difference between the turning angle θw and the steering angle θs.

Also, the change amount of the steering angle Δθs capable of suppressing unnecessary movement of the steering wheel 41 can be obtained.

When the CPU 101 determines that the relationship $a_1$≤θw<$a_2$ is not satisfied (step S120: No), the transmission ratio α, that is, the first transmission ratio $α_{auto}$ is set to be infinite (step S140). Hence, as shown in FIG. 5, the steering angle θs is maintained at constant and the change amount of the steering angle Δθs becomes 0 so that the turning angle θw and the change amount of the steering angle Δθw are not included afterward. As a result, the change amount of the steering angle Δθs=0 is accomplished in a region of the turning angle θw where the steering angle θs may become large when operating in response to the turning angle θw, whereby unnecessary movement of the steering wheel 41 can be suppressed.

The CPU 101 calculates the target differential angle θg* by using the transmission ratio α which has been set by the CPU 101 (step S150), and the process is terminated. The target differential angle θg* is calculated with the following equation (1), $$θg^* = (1-1/α)θw \quad (1)$$

At this time, the CPU 101 serves as the target differential angle calculation unit M2.

The CPU 101 transmits the calculated target differential angle θg* to the variable steering angle apparatus 31. The motor control unit of the variable steering angle apparatus 31 applies voltage that generates a rotational torque corresponding to the received target differential angle θg* to the motor, thereby operating the variable steering angle apparatus 31. As a result, the steering wheel 41 can be operated with a desired steering angle θs with respect to the turning angle θw of the steering apparatus 42 which is set through the steering support apparatus 32.

According to the steering assist apparatus 10 of the first embodiment as described above, the first transmission ratio $α_{auto}$ during the automatic steering mode being executed is determined in accordance with the turning angle θw of the steering apparatus 42, that is running state of the vehicle, whereby the steering wheel 41 can be operated not to cause the driver to feel discomfort during the automatic steering mode being executed. Specifically, in the case where the turning angle θw is small when the vehicle is making a small turn, the first transmission ratio $α_{auto}$ is set to be less than 1, i.e., $α_{auto}$<1 so that the steering angle θs becomes larger than the turning angle θw. Hence, since the change amount of the steering angle Δθs of the steering wheel 41 becomes larger, the driver can visually recognize the movement of the steering wheel 41 easily. Also, in the case where the turning angle θw is large when the vehicle is making a large turn, the first transmission ratio $α_{auto}$ is set to infinite, i.e., first transmission ratio $α_{auto}$=infinite, whereby the steering angle θs does not change even if the turning angle θw changes afterward. As a result, the change amount of the steering angle Δθs becomes 0 so that the steering wheel 41 does not operate. Therefore, unnecessary movement of the steering wheel 41 can be suppressed and unexpected contact between the steering wheel 41 that continues to rotate and the driver can be avoided. Further, during a turning operation other than the above-described case, since the first transmission ratio $α_{auto}$ is set to 1, i.e., first transmission ratio $α_{auto}$=1, the steering angle θs and the change amount of the steering angle Δθs are the same as the turning angle θw and the change amount of the turning angle Δθw, the driver of the steering wheel 41 can recognize a movement of the steering wheel 41 and also unnecessary movement of the steering wheel 41 can be suppressed or avoided. An automatic steering operation where the turning angle θw becomes large includes, for example, a case of entering or leaving a parking lot, a case where the vehicle changes its direction when traveling with low speed, or a case where the vehicle runs on a curved road requiring additional steering.

Second Embodiment

A steering assist apparatus according to a second embodiment differs from the steering assist apparatus 10 of the first embodiment in that the first transmission ratio $\alpha_{auto}$ is determined, as a running state of the vehicle, based on a change in the turning angle θw of the steering apparatus 42 with respect to time, that is, the angular velocity of the turning angle. Since the steering assist apparatus 10 according to the second embodiment includes the same configuration as that of the first embodiment, the same reference numbers are applied to the same configuration and the explanation thereof will be omitted.

Figure 6:
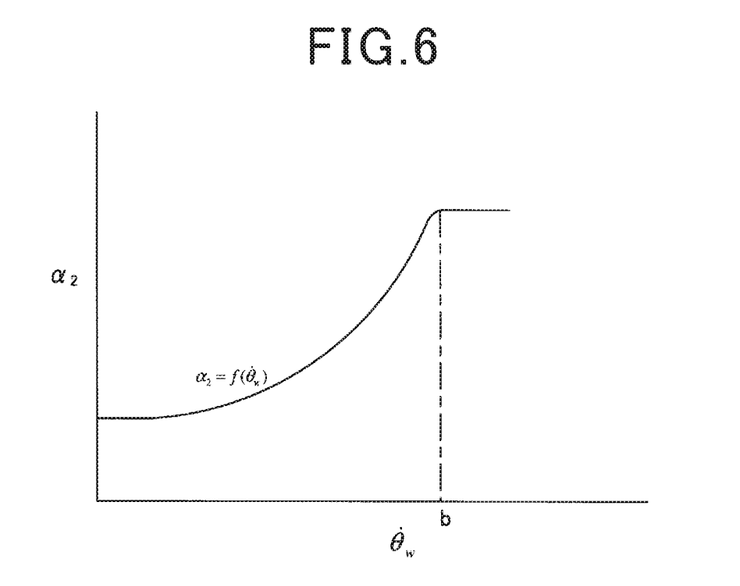
FIG. 6 is an explanatory diagram showing an example of a map used for determining the transmission ratio in a steering assist apparatus according to a second embodiment.

With reference to FIG. 6, a determination process of the first transmission ratio $\alpha_{auto}$ in the steering assist apparatus 10 according to the second embodiment will be described. In FIG. 6, the horizontal axis shows a differential value of the turning angle θw, that is, a change rate and an angular velocity, and the vertical axis shows a transmission ratio $\alpha_2$ which is determined as a first transmission ratio $\alpha_{auto}$. As shown in FIG. 6, the transmission ratio $\alpha_2$ increases as a second order curve having convex shape extending downward up to the determination value b of the change rate and becomes constant after the determination value b. The determination value b is defined as a change rate of the turning angle θw triggered by emergency evasive driving. Note that the transmission rate $a_2$ can be expressed as a function of the differential value of the turning angle θw.

According to the above-described steering assist apparatus 10 of the second embodiment, the first transmission ratio auto is determined, as a running state of the vehicle, in accordance with the angular velocity of the turning angle θw, and the transmission ratio $\alpha_2$ is set to be constant when the differential value of the turning angle θw exceeds the determination value b which is a change rate corresponding to the emergency evasion. Accordingly, even when the turning angle θw changes significantly, the change in the steering angle θs of the steering wheel 41 is suppressed and rapid steering of the steering wheel 41 which is not necessary for the driver can be avoided. The determination of the first transmission ratio $\alpha_{auto}$ according to the second embodiment may be performed separately from the determination of the first transmission ratio $\alpha_{auto}$ in the first embodiment, or may be applied to both embodiments.

Third Embodiment

The steering assist apparatus 10 according to the third embodiment differs from the steering assist apparatus 10 of the first embodiment in that the first transmission ratio $\alpha_{auto}$ is determined, as a running state of the vehicle, based on the travelling speed V of a vehicle 500. Note that the steering assist apparatus according to the third embodiment is provided with the same configurations as that of the first embodiment. Hence, the same reference numbers are applied to the same configurations and the explanation thereof will be omitted.

Figure 7:
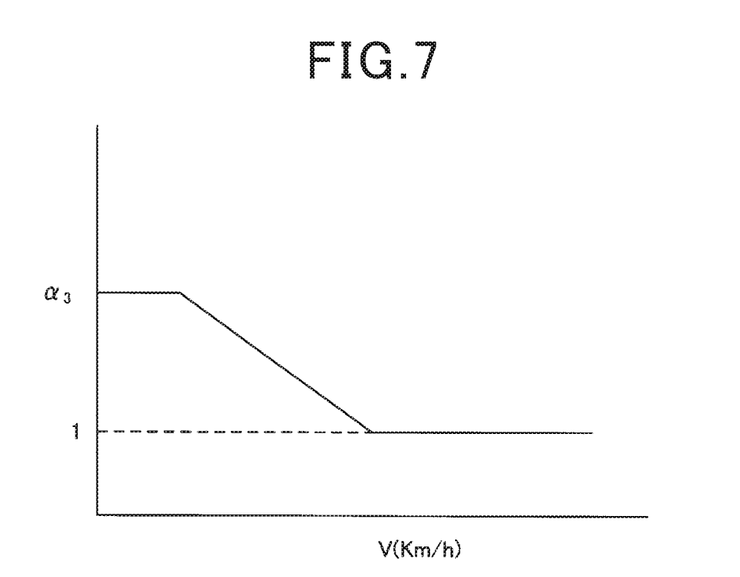
FIG. 7 is an explanatory diagram showing an example of a map used for determining the transmission ratio in a steering assist apparatus according to a third embodiment.

With reference to FIG. 7, a determination process of the first transmission ratio $\alpha_{auto}$ in the steering assist apparatus 10 according to the third embodiment will be described. In FIG. 7, the horizontal axis shows a travelling speed V (km/h), and the vertical axis shows a transmission ratio $\alpha_3$ determined as the first transmission ratio $\alpha_{auto}$. As shown in FIG. 7, the transmission ratio $\alpha_3$ is a predetermined constant value larger than 1 in a region where the travelling speed V shows low, the transmission ratio $\alpha_3$ is 1 in a region where the travelling speed V shows high, and the transmission ratio $\alpha_3$ decreases linearly till 1 in the intermediate region.

According to the steering assist apparatus 10 of the third embodiment, the first transmission ratio $\alpha_{auto}$ is determined based on the travelling speed of the vehicle 500 as a running state of the vehicle, and the transmission ratio $\alpha_3$ is set to be larger than 1 in a low speed region where the turning angle θw of the steering apparatus 42 is likely to be larger. Therefore, even when the turning angle θw significantly changes, the change in the steering angle θs of the steering wheel 41 is suppressed and a rapid steering of the steering wheel 41 which is not necessary for the driver can be avoided. The determination of the first transmission ratio $\alpha_{auto}$ according to the third embodiment may be performed separately from the determination of the first transmission ratio $\alpha_{auto}$ in the first and second embodiments, or may be applied to those embodiments. In other words, as the first transmission ratio $\alpha_{auto}$ which is determined depending on the running state, logical OR of the transmission ratios $\alpha_1$ to $\alpha_3$ used for the first to third embodiments, that is, $\alpha_{auto}=\alpha_1 \times \alpha_2 \times \alpha_3$, may be used.

Fourth Embodiment

The steering assist apparatus 10 according to the fourth embodiment differs from the steering assist apparatus 10 of the first embodiment in that the first transmission ratio $\alpha_{auto}$ is determined, as road information, based on the turning curvature. Note that the steering assist apparatus according to the fourth embodiment is provided with the same configurations as that of the first embodiment. Hence, the same reference numbers are applied to the same configurations and the explanation thereof will be omitted.

Figure 8:
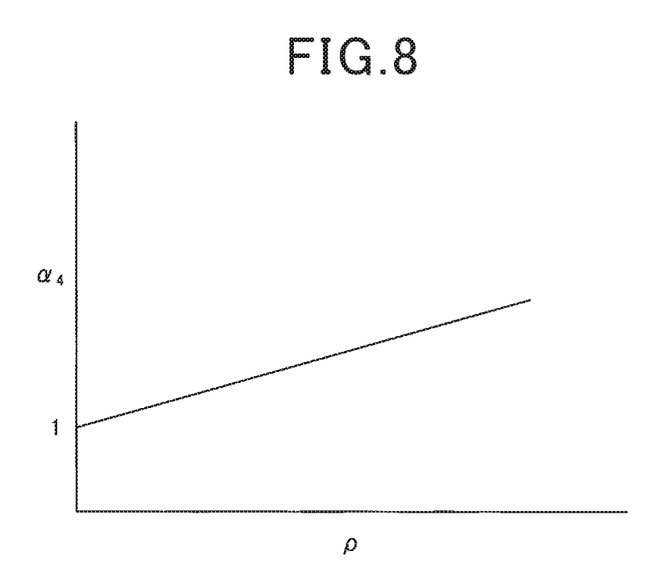
FIG. 8 is an explanatory diagram showing an example of a map used for determining the transmission ratio in a steering assist apparatus according to a fourth embodiment.

With reference to FIG. 8, a determination process of the first transmission ratio $\alpha_{auto}$ in the steering assist apparatus 10 according to the fourth embodiment will be described. In FIG. 8, the horizontal axis shows a turning curvature ρ, the vertical axis shows a transmission ratio $\alpha_4$ determined as the first transmission ratio $\alpha_{auto}$. The turning curvature ρ is defined as a variable used for determining the running locus along a road having a predetermined curvature and determining the target turning angle θw* to be accepted by the steering support apparatus 32. The turning curvature ρ is obtained based on the map data for the navigation system, or can be calculated based on the image data captured by the front camera 22. As shown in FIG. 8, the transmission ratio $\alpha_4$ is set such that the larger the turning curvature ρ, that is, the tighter the curvature on the running locus, the larger the transmission ratio $\alpha_4$.

According to the steering assist apparatus 10 of the fourth embodiment, the first transmission ratio $\alpha_{auto}$ is determined based on the turning curvature to which the vehicle 500 follows in the automatic steering mode as a running state of the vehicle, and the transmission ratio $\alpha_4$ is set such that the larger the turning curvature, the larger the transmission ratio $\alpha_4$ is. Therefore, even when the turning angle θw significantly changes, the change in the steering angle θs of the steering wheel 41 is suppressed and a steering operation of the steering wheel 41 which is not necessary for the driver can be avoided. The determination of the first transmission ratio $\alpha_{auto}$ according to the fourth embodiment may be performed separately from the determination of the first transmission ratio $\alpha_{auto}$ which is determined depending on the running state, or may be performed together. In other words, when performing together with the first transmission ratio $\alpha_{auto}$ which is determined depending on the running state, logical OR of the respective transmission ratios may be used.

Fifth Embodiment

The steering assist apparatus 10 according to the fifth embodiment differs from the steering assist apparatus 10 of the first embodiment in that the first transmission ratio $\alpha_{auto}$ is determined, as road information, based on a change rate of the turning curvature ρ. Note that the steering assist apparatus according to the fifth embodiment is provided with the same configurations as that of the first embodiment. Hence, the same reference numbers are applied to the same configurations and the explanation thereof will be omitted.

Figure 9:
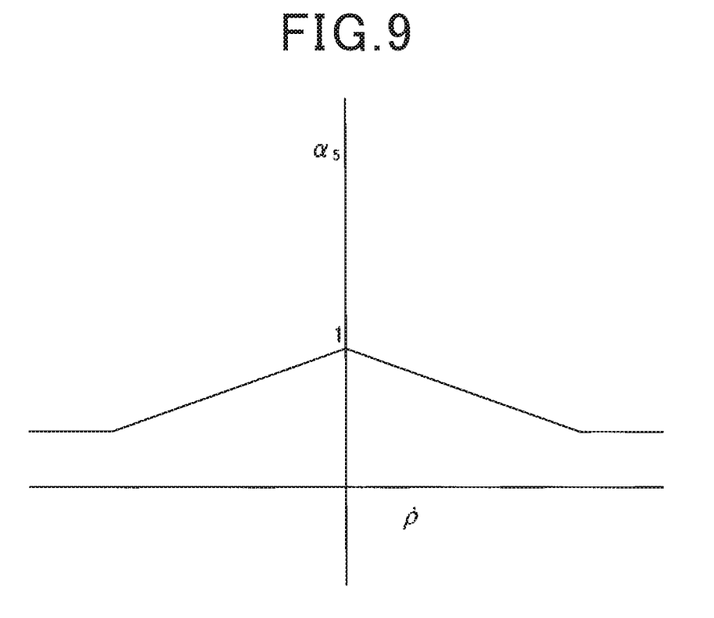
FIG. 9 is an explanatory diagram showing an example of a map used for determining the transmission ratio in a steering assist apparatus according to a fourth embodiment.

With reference to FIG. 9, a determination process of the first transmission ratio $\alpha_{auto}$ in the steering assist apparatus 10 according to the fifth embodiment will be described. In FIG. 9, the horizontal axis shows a differential value of the turning curvature ρ, the vertical axis shows a transmission ratio $\alpha_5$ determined as the first transmission ratio $\alpha_{auto}$. The differential value of the turning curvature ρ, that is, the change rate of the turning curvature ρ is used, whereby it can be determined whether the vehicle 500 changes from the turning travelling to the straight forward travelling or from the straight forward travelling to the turning travelling. When the vehicle 500 enters a curved road from a straight road, the differential value of the turning curvature ρ is a positive value, and when the vehicle 500 runs towards the straight road from the curved road, the differential value of the turning curvature ρ is a negative value. As shown in FIG. 9, the transmission ratio $\alpha_5$ is set such that the larger the absolute value of the differential value of the turning curvature ρ, the smaller the value of the transmission ratio $\alpha_5$ which is less than 1.

According to the steering assist apparatus 10 of the fourth embodiment, the first transmission ratio $\alpha_{auto}$ is determined based on the differential value of the turning curvature to which the vehicle 500 follows in the automatic steering mode as a running state of the vehicle, and the transmission ratio $\alpha_5$ is set such that such that the larger the absolute value of the differential value of the turning curvature ρ, the smaller the value of the transmission ratio $\alpha_5$ to be less than 1. This means, in the case where the vehicle 500 enters the curved road having a large curvature, or leaves the curved road having a large curvature, the change amount of the steering angle Δθs of the steering wheel 41 becomes larger than the change amount of the turning angle Δθw. Hence, the steering assist apparatus 10 can visually notify the driver that the vehicle enters a curved road or the vehicle has left from the curved road. In particular, the first transmission ratio $\alpha_{auto}$ is changed to the transmission ratio $\alpha_5$ in advance at a point few meters prior to a point where the vehicle enters the curved road or leaves from the curved road, that is, a point where the steering apparatus 42 significantly changes the turning angle θw, whereby the driver can be effectively notified that the vehicle 500 enters a curved road or escaped from a curved road. This is accomplished by acquiring road information about a distance of several meters in front of the vehicle, that is, the turning curvature ρ. Also, since the transmission ratio $\alpha_5$ is set to be constant in a region where the absolute value of the turning curvature ρ is large, a steering operation of the steering wheel 41 which is not necessary for the driver can be avoided. The determination of the first transmission ratio $\alpha_{auto}$ according to the fifth embodiment may be performed separately from the determination of the first transmission ratio $\alpha_{auto}$ which is determined depending on the running state, or may be performed together. In other words, when performing together with the first transmission ratio $\alpha_{auto}$ which is determined depending on the running state, a logical AND of the respective transmission ratios may be used. Further, the determination process of the first transmission ratio $\alpha_{auto}$ according to the fifth embodiment may be used together with the determination process of the first transmission ratio $\alpha_{auto}$ according to the fourth embodiment.

First Modification

In the above-described embodiments, as the steering mechanism 40, a combination of the variable steering angle apparatus 31 and the steering support apparatus 32 is used. However, a steer-by-wire mechanism which requires no mechanical connection may be provided between the steering wheel 41 and the steering apparatus 42. In this case, a motor that gives a reaction force is disposed at a tip end of the upper steering shaft connected to the steering wheel 41, and the steering drive unit including a motor is disposed in the steering apparatus 42. In the manual steering mode, the control unit 100 determines a steering angle and controls the steering support apparatus 32 to drive the steering apparatus 42. Further, instead of using the steering wheel 41, a steering input device having a stick shape which is controlled with a linear motion, that is, a steering stick may be used. The steering stick moves, as reciprocating movement, on a straight line having a neutral position at the middle point thereof. The operating position on the straight line corresponds to the steering angle θs. The steering position which is the operating position on the straight line is converted to the steering angle θs and used for existing processes. Accordingly, the steering angle of the steering input apparatus is a concept including a steering position. Also in this case, similar problems in the case of the change amount of the steering angle may arise for the change amount of the steering position. Hence, even when the steer-by-wire mechanism is used, advantages as described in the above embodiments can be obtained.

Second Modification

In addition to at least either the running state or the road information used in the above-described embodiments, the first transmission ratio $\alpha_{auto}$ may be determined depending on the confidence degree C. of the steering assist apparatus 10. For example, when the confidence degree C. is lower than a determination threshold before the mode is switched to the automatic steering mode, or when the confidence degree C. is lowered during the automatic steering mode or when the confidence degree C. is lowered during the automatic steering operation mode, the control determines the transmission ratio α to be smaller as the first transmission ratio $\alpha_{auto}$. The smaller transmission ratio α can cause the driver to visually recognize a change in the turning angle θw of the steering apparatus 42 as a change in the steering angle θs of the steering wheel 41. Moreover, even when the driver intervenes in the steering operation through the steering wheel 41, the turning angle θw is prevented from excessively reacting relative to the steering angle θs as a steering input via the steering wheel 41.

Third Modification

The first to fifth embodiments may be appropriately combined or determination processes of respective embodiments may be appropriately combined.

Fourth Modification

In the first to fifth embodiments, the CPU 101 executes the steering assist program P1 and the transmission ratio determination program P2, thereby accomplishing the steering control unit and the transmission ratio determination unit as software. However, the steering control unit and the transmission ratio determination unit may be accomplished as hardware configured of, for example, an integrated circuit programmed in advance, or discrete circuits.

The present disclosure has been described based on the embodiments and modifications. The above-described embodiments are provided to readily understand the present disclosure and do not limit the present disclosure thereof. The present disclosure may be modified and improved without departing the sprit and the scope of claims, and includes equivalents thereof. For example, embodiments corresponding to technical features in the various aspect described in the summary section, and technical features described in the modifications sections can be appropriately replaced or combined to solve a part of or all of the above-described problems or to achieve a part of or all of the above-described effects. Moreover, when any of those technical features is not described in the present specification as essential features, the feature can be appropriately removed.

Application example 1: a steering assist apparatus of the vehicle according to the above-described first aspect is defined as an application example 1, for example.

Application example 2: the steering assist apparatus according to the application example, wherein the transmission ratio determination unit further determines the first transmission ratio based on the turning angle.

Application example 3: the steering assist apparatus according to the application example 2, wherein the transmission ratio determination unit determines the first transmission ratio such that the larger the turning angle, the larger the first transmission ratio is.

Application example 4: the steering assist apparatus according to any one of application examples 1 to 3, wherein the transmission ratio determination unit determines the first transmission ratio based on a change rate of the turning angle.

Application example 5: the steering assist apparatus according to application example 4, wherein the transmission ratio determination unit determines the first transmission ratio such that the larger the change rate of the turning angle, the larger the first transmission ratio is.

Application example 6: the steering assist apparatus according to any one of application examples 1 to 5, wherein the transmission ratio determination unit further determines the first transmission ratio based on a travelling speed of the vehicle.

Application example 7: the steering assist apparatus according to any one of application examples 1 to 6, wherein the transmission ratio determination unit further determines the first transmission ratio based on a turning curvature.

Application example 8: the steering assist apparatus according to application example 7, wherein the transmission ratio determination unit changes the transmission ratio such that the larger the turning curvature, the larger the transmission ratio is.

Application example 9: the steering assist apparatus according to any one of application examples 1 to 8, wherein the transmission ratio determination unit further determines the first transmission ratio based on a confidence degree of the steering assist apparatus.

Application example 10: the steering assist apparatus according to application example 9, wherein the transmission ratio determination unit determines the first transmission ratio such that the smaller the confidence degree, the smaller the first transmission ratio is.

Application example 11: the steering assist apparatus according to any one of application examples 1 to 10 further includes an angle variation unit that generates a differential angle between the steering angle and the turning angle; and the steering control unit controls the steering variation unit so as to further generates a differential angle based on the first transmission ratio or the second transmission ratio.

Application example 12: the steering assist apparatus according to application examples 11, wherein the steering control unit controls, when the vehicle changes a direction from a straight forward travelling to a turning travelling or from the turning traveling to the straight forward travelling, the steering angle variation unit with the first transmission ratio to change the steering angle before changing the turning angle.

Application example 13: the steering assist apparatus according to any one of application examples 1 to 10, wherein the steering control unit further determines, during the manual steering mode, the turning angle by using the steering angle and the second transmission ratio, and controls the steering drive unit so as to accomplish the determined turning angle.

Application example 14: the steering assist apparatus according to application example 13 further includes a steering input drive unit that drives the steering input apparatus; the steering control unit further controls, when the vehicle changes from a straight forward travelling to the turning travelling or from the turning traveling to the straight forward travelling, the steering input drive unit with the first transmission ratio so as to change the steering angle before changing the turning angle.

What is claimed is:

1. A steering assist apparatus of a vehicle provided with a steering input apparatus that inputs a steering angle and a steering apparatus that steers wheels of the vehicle with a turning angle, the steering input apparatus and the steering apparatus performing a differential operation with a transmission ratio which is a ratio of a change amount of the steering angle to a change amount of the turning angle, the steering assist apparatus comprising:

a steering drive that drives the steering apparatus;
a processor configured to perform functions including:
   a steering control that executes an automatic steering mode in which the steering drive is controlled such that a turning angle is determined based on at least either a running state of the vehicle or road information to accomplish the turning angle; and
   a transmission ratio determination that determines, based on a turning curvature and at least either a running state of the vehicle or the road information, a first transmission ratio in the automatic steering mode to be a value different from a second transmission ratio in a manual steering mode in which the steering apparatus operates in accordance with the steering angle inputted via the steering input apparatus,
wherein the transmission ratio determination changes the transmission ratio such that the larger the turning curvature, the larger the transmission ratio is.

2. The steering assist apparatus according to claim 1, wherein the transmission ratio determination further determines the first transmission ratio based on the turning angle.

3. The steering assist apparatus according to claim 2, wherein the transmission ratio determination unit determines the first transmission ratio such that the larger the turning angle, the larger the first transmission ratio is.

4. The steering assist apparatus according to claim 1, wherein the transmission ratio determination unit determines the first transmission ratio based on a change rate of the turning angle.

5. The steering assist apparatus according to claim 4, wherein the transmission ratio determination determines the first transmission ratio such that the larger the change rate of the turning angle, the larger the first transmission ratio is.

6. The steering assist apparatus according to claim 1, wherein the transmission ratio determination further determines the first transmission ratio based on a travelling speed of the vehicle.

7. The steering assist apparatus according to claim 1, wherein the transmission ratio determination further determines the first transmission ratio based on a confidence degree of the steering assist apparatus.

8. The steering assist apparatus according to claim 7, wherein the transmission ratio determination determines the first transmission ratio such that the smaller the confidence degree, the smaller the first transmission ratio is.

9. The steering assist apparatus according to claim 1, further comprising:
a variable steering angle apparatus that generates a differential angle between the steering angle and the turning angle; and
the steering control controls the variable steering angle apparatus so as to further generate a differential angle based on the first transmission ratio or the second transmission ratio.

10. The steering assist apparatus according to claim 9, wherein
the steering control controls, when the vehicle changes a direction from straight forward travelling to turning travelling or from the turning traveling to the straight forward travelling, the variable steering angle apparatus with the first transmission ratio to change the steering angle before changing the turning angle.

11. The steering assist apparatus according to claim 1, wherein
the steering control further determines, during the manual steering mode, the turning angle by using the steering angle and the second transmission ratio, and controls the steering drive so as to accomplish the turning angle.

12. The steering assist apparatus according to claim 11, further comprising:
a steering input drive apparatus that drives the steering input apparatus; and
the steering control further controls, when the vehicle changes a direction from straight forward travelling to turning travelling or from the turning traveling to the straight forward travelling, the steering input drive apparatus with the first transmission ratio so as to change the steering angle before changing the turning angle.

13. A computer-implemented method for steering assist of a vehicle provided with a steering input apparatus that inputs a steering angle and a steering apparatus that steers wheels of the vehicle with a turning angle, the steering input apparatus and the steering apparatus performing a differential operation with a transmission ratio which is a ratio of a change amount of the steering angle to a change amount of the turning angle, the method comprising steps of:
determining, based on at least either a running state of the vehicle or road information, a first transmission ratio in an automatic steering mode to be a value different from a second transmission ratio in a manual steering mode in which the steering apparatus operates in accordance with the steering angle inputted via the steering input apparatus;
executing the automatic steering mode in which a steering drive is controlled such that a turning angle is determined based on a turning curvature and at least either the running state of the vehicle or the road information to accomplish the turning angle; and
changing the transmission ratio such that the larger the turning curvature, the larger the transmission ratio is.

* * * * *